United States Patent [19]

Anton et al.

[11] Patent Number: 5,605,956

[45] Date of Patent: Feb. 25, 1997

[54] FLUORINATED POLYISOCYANATES

[75] Inventors: Douglas R. Anton, Wilmington, Del.; Michael J. Darmon, Aston; William F. Graham, Wayne, both of Pa.; Richard R. Thomas, Wilmington, Del.

[73] Assignee: E. I. Du Pont de Nemours and Company, Wilmington, Del.

[21] Appl. No.: 543,773

[22] Filed: Oct. 16, 1995

[51] Int. Cl.[6] .............................. C08J 3/00; C08K 3/20; C08L 75/00; C08G 18/28

[52] U.S. Cl. .................. 524/590; 524/539; 525/123; 528/70; 568/842

[58] Field of Search .............. 528/70; 568/842; 524/590, 539; 525/123, 455

[56] References Cited

U.S. PATENT DOCUMENTS

| | | | |
|---|---|---|---|
| 2,803,615 | 8/1957 | Ahlbrecht et al. | 260/29.6 |
| 3,255,131 | 6/1966 | Ahlbrecht et al. | 260/22 |
| 3,318,852 | 5/1967 | Dixon | 260/78.5 |
| 3,533,977 | 10/1970 | Read | 260/28.5 |
| 3,547,894 | 12/1970 | Smeltz | 260/77.5 |
| 3,759,874 | 9/1973 | Gresham | 260/77.5 |
| 3,972,856 | 8/1976 | Mitsch et al. | 260/77.5 |
| 4,366,299 | 12/1982 | Dessaint | 526/243 |
| 4,371,657 | 2/1983 | Chang | 524/512 |
| 4,396,680 | 8/1983 | Chang | 428/421 |
| 4,782,130 | 11/1988 | Re et al. | 528/70 |
| 4,791,166 | 12/1988 | Saukaitis | 524/544 |
| 4,812,337 | 3/1989 | Sugimura et al. | 427/407.1 |
| 4,837,198 | 6/1989 | Kuriyama et al. | 503/227 |
| 4,841,007 | 6/1989 | Zdrahala et al. | 528/28 |
| 4,859,754 | 8/1989 | Maekawa et al. | 526/245 |
| 5,064,695 | 11/1991 | Hotta et al. | 427/407.1 |
| 5,159,017 | 10/1992 | Miyazono et al. | 525/123 |
| 5,171,877 | 12/1992 | Knaup et al. | 560/26 |
| 5,206,286 | 4/1993 | Swarup et al. | 524/761 |
| 5,250,698 | 10/1993 | Falk et al. | 548/260 |
| 5,254,660 | 10/1993 | Kirchmeyer et al. | 528/49 |
| 5,356,668 | 10/1994 | Paton et al. | 427/2.25 |
| 5,484,818 | 1/1996 | De Vos et al. | |

FOREIGN PATENT DOCUMENTS

| | | |
|---|---|---|
| 60-184513 | 9/1985 | Japan . |
| 61-14267 | 1/1986 | Japan . |
| 61-23656 | 2/1986 | Japan . |
| 61-23657 | 2/1986 | Japan . |
| 61-95078 | 5/1986 | Japan . |
| 62-26736 | 11/1987 | Japan . |
| 63-287615 | 12/1991 | Japan . |

*Primary Examiner*—Paul R. Michl
*Assistant Examiner*—Patrick Niland
*Attorney, Agent, or Firm*—Hilmar L. Fricke

[57] ABSTRACT

A fluorinated polyisocyanate which comprises an organic polyisocyanate reacted with a fluorinated monofunctional alcohol represented by the formula

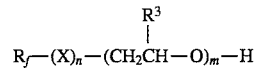

where $R_f$ is a fluoroalkyl containing group having at least 4 carbon atoms, X is a divalent radical, $R^3$ is H or an alkyl group having 1–4 carbon atoms, n is 0–1 and m is 0–30, provided that when n is 0 then m must be equal to or greater than 1 and when m is 0, n is 1, wherein about 0.1–33 mole percent of active isocyanate groups are reacted with the fluorinated monofunctional alcohol; the fluorinated polyisocynate can be used with acrylic polymers, polyesters, alkyd resins, polyols and the like to form coating compositions, sealants, adhesives and the like.

8 Claims, No Drawings

FLUORINATED POLYISOCYANATES

BACKGROUND OF THE INVENTION

1. Field of the Invention

This invention is directed to fluorinated polyisocyanates that are useful in forming coating compositions, sealants and adhesives.

2. Description of the Prior Art

Fluorinated polyurethanes that are used as soil release agents are shown in Graham U.S. Pat. 3,759,874 issued Sep. 18, 1973. Polyurethanes of fluorinated isocyanates that are used as adhesives are shown in Mitsch et al U.S. Pat. 3,972,856 issued Aug. 3, 1976. Protective coatings of fluorinated polyurethanes of fluorinated diols or triols are shown in Re et al U.S. Pat. 4,782,130 issued Nov. 1, 1988.

There is a need for fluorinated polyisocyanates that can be used with acrylic polymers, polyesters, alkylds, polyols to form coatings, adhesives, sealants and the like that can be applied with conventional equipment and cures to tough durable compositions without baking at elevated temperatures.

SUMMARY OF THE INVENTION

A fluorinated polyisocyanate of an organic polyisocyanate reacted with a fluorinated monofunctional alcohol represented by the formula

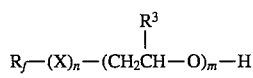

where $R_f$ is a fluoroalkyl containing group having at least 4 carbon atoms, X is a divalent radical, $R^3$ is H or an alkyl group having 1–4 carbon atoms, n is 0–1 and m is 0–30 provided that when n is 0 then m must be equal to or greater than 1 and when m is 0 then n is 1; wherein about 0.1–33 mole percent of active isocyanate groups are reacted with the fluorinated monofunctional alcohol.

Compositions containing the fluorinated polyisocyanate and articles coated with such composition also are part of this invention.

DETAILED DESCRIPTION OF THE INVENTION

The fluorinated organic polyisocyanate is an adduct of a fluorinated monofunctional alcohol and a conventional organic polyisocyanate. Any of the conventional aromatic, aliphatic, cycloaliphatic di and trifunctional polyisocyanates can be used. Typically useful diisocyanates are 1,6-hexamethylene diisocyanate, isophorone diisocyanate, 4,4'-biphenylene diisocyanate, toluene diisocyanate, his cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,5-toluene triisocyanate and the like. Oligomers of diisocyanates also can be used such as the trimer of hexamethylene diisocyanate which is sold under the tradename "Desmodur" N. One particularly preferred oligomer is "Desmodur" N-3390.

Typical fluorinated monofunctional alcohols used to form the isocyanate functional adducts are represented by the formula

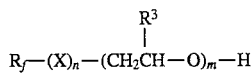

where $R_f$ is as defined above, a fluoroalkyl containing group having at least 4 carbon atoms and preferably a straight chain or branched chain fluoroalkyl group having 4–20 carbon atoms which optionally can contain oxygen atoms as ether groups or can contain 1–5 chlorine atoms or 1–5 hydrogen atoms. Preferably, $R_f$ is a perfluoroalkyl group having 4–20 carbon atoms and most preferably, $R_f$ is a perfluoroalkyl group containing 6–12 carbon atoms. X is a divalent radical, preferably—$CH_2CH_2O$—, —$SO_2N(R^4)CH_2CH_2O$—, —$CH_2$—, —O—, —$CH_2O$— where $R^4$ is an alkyl group preferably having 1–4 carbon atoms. $R^3$ is H or an alkyl group having 1–4 carbon atoms, H and methyl being preferred, n is 0–1 and m is 0–30, provided that if n is 0, then m must be greater than or equal to 1, if m is 0, then n is 1, if X is —O—, m must be greater than or equal to 1; m preferably is 1–20.

The following are preferred fluorinated monofunctional alcohols:

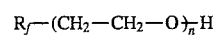

where $R_f$ is a perfluoroalkyl group having 6–12 carbon atoms and n is 5–15;

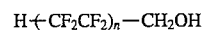

where n is 1–6;

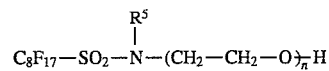

where $R^5$ is an alkyl group having 1–4 carbon atoms and n is 1–30;

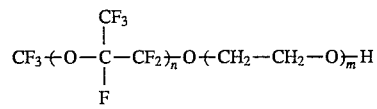

where n is 0–10 and m is 1–20; and $R_f$—$CH_2H$—$CH_2$—OH where $R_f$ is described above.

The fluorinated organic polyisocyanate is prepared by conventional techniques in which the fluorinated monfunctional alcohol and organic polyisocyanate are charged into a reaction vessel optionally with solvents and a catalyst for about 0.1–4 hours and heated to about 50°–120° C. preferably, 60°–85° C.

About 0.1–33 mole percent of active isocyanate groups of the organic polyisocyanate are reacted with the fluorinated monofunctional alcohol which leaves sufficient amount of unreacted isocyanate groups to react with functional groups of other components of a composition to form a crosslinked composition on curing. Preferably, about 0.1–10 mole percent of active isocyanate groups are reacted with the fluorinated monofunctional alcohol to provide a less costly fluorinated organic polyisocyanate which can be used with other film forming polymeric components having groups that are reactive with isocyanates to form crosslinked compositions.

Typical solvents that are used are alkyl acetates such as ethyl acetate, butyl acetate and the like, alkylene glycol alkyl ether acetates such as ethylene glycol, mono butyl ether acetate and the like.

Typical catalysts that are used are organo tin containing catalysts like alkyl tin laurates such as di-n-butyl tin dilaurate, dibutyl tin di-2-ethylhexoate, stannous octoate, stannous oleate and the like.

The fluorinated polyisocyanate when blended with another film forming binder is useful for forming coating compositions, adhesives, sealants, caulks and the like. Typical film forming binders are polymeric components having groups such as hydroxyl, carboxyl, epoxy amine, amide and the like that are reactive with an isocyanate such as acrylic polymers, polyesters, alkyd resins, polyethers, hydroxy or carboxyl containing polyurethanes and the like.

The fluorinated polyisocyanates are particularly useful in forming high quality coating compositions. These coating compositions can be clear coat compositions used over a pigmented base coat containing solid color pigments or metallic flake pigments or mixtures thereof and can be used as a conventional pigmented composition. The coating composition can be applied with conventional spray equipment and cured at ambient temperatures or slightly elevated temperatures which decrease drying time. The resulting finish whether clear or pigmented has excellent dirt, water and oil repellence, is easily cleaned by washing with water or a water surfactant mixture or can readily be wiped clean and has good stain resistance and good weatherability.

One useful coating composition is a clear coating composition, i.e. containing no pigments or a small amount of transparent pigment. The composition has a relatively high solids content of about 45–80% by weight of binder and about 20–55% by weight of an organic carrier which can be a solvent for the binder or a mixture of solvents and non solvent which would form a non aqueous dispersion. The composition has a low VOC (volatile organic content) and meets current pollution regulations.

Typically useful acrylic polymers that can be used to form the aforementioned coating compositions are formed by conventional polymerization procedures using conventional solvents and catalysts. Typical polymerizable monomers that are used to form these acrylic polymers are alkyl (meth)acrylates, meaning alkyl acrylates and alkyl methacrylates, having 1–18 carbon atoms in the alkyl group such as methyl methacrylate, ethyl acrylate, ethyl methacrylate, propyl acrylate, propyl methacrylate, isopropyl methacrylate, butyl acrylate, isobutyl methacrylate, butyl methacrylate, t-butyl methacrylate, pentyl acrylate, pentyl methacrylate, hexyl acrylate, hexyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate; other useful monomers are styrene, alpha methyl styrene, acrylamide, methacrylamide, acrylonitrile, hydroxy methacrylamide and the like or any mixtures of these monomers, and hydroxy alkyl (meth)acrylates meaning hydroxy alkyl acrylates and hydroxy alkyl methacrylates having 1–4 carbon atoms in the alkyl groups such as hydroxy methyl acrylate, hydroxy methyl methacrylate, hydroxy ethyl acrylate, hydroxy ethyl methacrylate, hydroxy propyl methacrylate, hydroxy propyl acrylate, hydroxy butyl acrylate, hydroxy butyl methacrylate and the like.

To improve weatherability of the coating composition, ultraviolet light stabilizers, screeners, quenchers and antioxidants can be added. Generally, the coating composition contains a catalyst such as an alkyl tin laurate to cure at ambient temperatures and often contains a flow control agent.

Coating compositions formulated with the fluorinated polyisocyanate can be used as a clear coating on a vehicle such as a car, track, bus, train, or on construction equipment, industrial equipment, structures such as tanks, bridges, exterior or interior of buildings, a basecoating which may be either a solvent based or waterbased composition is first applied and then the clear coating is applied usually by conventional means such as spraying or electrostatic spraying. The clear coating is dried and cures at ambient temperatures but moderately high temperatures of up to about 90° C. can be used to shorten drying time.

When the fluorinated polyisocyanate is used as a crosslinking agent in a clear coat that is used over a pigmented base coat, it is highly desirable to use at least some fluorinated polyisocyanate in the base coat to significantly reduce cratering in the base coat. Usually, about 10–40% by weight, based on the weight of the binder, of the fluorinated polyisocyanate is used in the base coat.

The following examples illustrate the invention. All parts and percentages are on a weight basis unless otherwise specified. Molecular weight was determined by gel permeation chromatography using polystyrene as the standard.

EXAMPLE 1

Fluorinated polyisocyanate solution I was prepared by mixing the following constituents in a reaction vessel equipped with a mechanical stirrer, condenser, nitrogen inlet and a thermocouple:

|  | Parts by Weight |
| --- | --- |
| Portion 1 | |
| Aliphatic isocyanate resin - trimer of hexamethylene diisocyanate (98.9% solids) | 3000.00 |
| Butyl acetate | 275.00 |
| Ethyl acetate | 550.00 |
| Ethylene glycol monobutyl ether acetate | 175.00 |
| Portion 2 | |
| Fluoroalkyl alcohol $F(CF_2)_nCH_2CH_2O(CH_2CH_2O)_mH$ where n is an average of 6 and m is an average of 7.5 | 27.20 |
| Di-n-butyl tin dilaurate solution (2% solids in ethyl acetate) | 0.50 |
| Total | 4027.70 |

Portions 1 and 2 were each added to the reaction vessel under a positive pressure of nitrogen and heated to about 75°–80° C. and held at this temperature for about 2 hours and allowed to cool overnight. The resulting fluorinated polyisocyanate solution I contained about 1% of the fluorinated component.

Fluorinated polyisocyanate solution II was prepared as above except the mount of the fluorinating component was reduced by 50% which resulted in a fluorinated polyisocyanate that contained 0.5% of the fluorinated component.

An acrylic polymer I solution was prepared in which the acrylic polymer has fluoro alkyl groups by charging the following constituents into a reactor equipped with a heat source, a thermometer and a stirrer:

|  | Parts By Weight |
|---|---|
| Portion 1 | |
| Methyl amyl ketone | 699.20 |
| Portion 2 | |
| Butyl methacrylate monomer (BMA) | 583.80 |
| Styrene monomer (S) | 307.28 |
| Butyl acrylate monomer (BA) | 343.20 |
| Hydroxy propyl acrylate monomer (HPA) | 783.60 |
| Methyl amyl ketone | 4.72 |
| Portion 3 | |
| Fluoroalkyl ethyl methacrylate monomer (FAMA) - (fluoroalkyl group containing C-4 about 4%, C-6 about 30%, C-8 about 30%, C-10 about 20%, C-12 about 10% C-14 and above about 5%) | 30.73 |
| Methyl amyl ketone | 30.00 |
| Portion 4 | |
| T-butyl peroxy acetate | 69.01 |
| Methyl amyl ketone | 114.59 |
| Portion 5 | |
| Methyl amyl ketone | 33.28 |
| Total | 2999.99 |

Portion 1 was charged into the reaction vessel and blanketed with nitrogen and Portion 2 was premixed and added over a 360 minute period while holding the resulting mixture at its reflux temperature of about 150° C. Portion 3 was premixed and then added at one time to the reaction mixture 350 minutes after the start of the addition of Portion 2. Portion 4 was premixed and added at the same time as Portion 2 to the reaction mixture over a 375 minute period and then Portion 5 was added and the reaction mixture was held at its reflux temperature for an additional 60 minutes. The resulting polymer solution was cooled to room temperature.

The resulting acrylic polymer solution I had a weight solids content of about 70%, a polymer of BMA/S/BA/HPA/FAMA in the following percentages 28.5%/15.0%/16.75%/38.25%/1.5% and the polymer had a weight average molecular weight of about 7,000.

A clear acrylic composition I was prepared as follows:

|  | Parts by Weight |
|---|---|
| Portion 1 | |
| Methyl ethyl ketone | 2.54 |
| Toluene | 2.67 |
| Dibasic acid ester (ester mixture of adipic acid, glutamic acid and succinic acid) | 1.79 |
| Butyl Cellosolve Acetate | 4.96 |
| Portion 2 | |
| Acrylic polymer I solution (prepared above) | 72.79 |
| Portion 3 | |
| Resiflow S (Acrylic polymer flow additive) | 0.35 |
| "Tinuvin" 328 - 2-(2-hydroxy-3,5-ditertiary amyl phenol)-2H-benzotriazole) | 5.58 |
| "Tinuvin" 292 - (1,2,2,6,6-pentamethyl-4-piperidinyl) sebacate | 0.87 |
| Dibutyl tin dilaurate | 0.92 |
| PM acetate | 7.38 |
| Total | 100.00 |

The constituents of Portion 1 were charged into a mixing vessel in the order shown with continuous mixing. Portion 2 was added and mixed for 15 minutes. The constituents of Portion 3 were charged into the mixing vessel in the order shown with constant mixing. The resulting composition had a solids content of about 53.5%.

A clear coating composition I was prepared by mixing the above clear acrylic composition I with a the above prepared fluorinated polyisocyanate solution I in a 3/1 volume ratio. Clear coating composition II was prepared by mixing the above clear acrylic composition I with the above prepared fluorinated polyisocyanate solution II in a 3/1 volume ratio.

Two phosphated cold rolled steel panels that had been coated with a cured electrocoating composition of a polyepoxy hydroxy ether resin crosslinked with a polyisocyanate were spray coated with a white basecoat coating composition of an acrylic polymer containing an organic polyisocyanate crosslinking agent to a dry film thickness of about 18–23 microns. The basecoat was allowed to stand for about 10 minutes to allow solvent to evaporate and then the above prepared clear coating composition I was spray applied. Two coats were applied with a solvent evaporation time of 2 minutes between the application of each coat. The resulting film was dried at about 83° C. for about 30 minutes. The dry film thickness of the clear coat was about 44–56 microns. The resulting clear coat was smooth and essentially free of craters and had an excellent appearance.

A second set of two panels was prepared. Phosphated cold rolled steel panel electrocoated with the same above described electrocoating composition were coated with a black basecoat coating composition identical to the white basecoat coating composition except black pigmentation was used instead of white pigment and coated with the clear coating composition I as above and dried and cured as above. The resulting clear coat was smooth and essentially free of craters and had an excellent appearance. The following properties of the clear coated panel were measured and the results are shown in Table I: 20° Gloss and Distinctness of Image (DOI).

Acrylic polymer II solution was prepared which is identical to the above acrylic polymer I solution except that fluoroalkyl ethyl methacrylate monomer was not added. The molecular weight of the polymer and the solids of the solution were about the same. A clear coating composition III was prepared as above using fluorinated polyisocyanate solution I (prepared above) and acrylic polymer II solution was used in place of acrylic polymer I solution. Two panels of phosphatized cold rolled steel coated with the same electrocoating composition and with the same white base coat were sprayed with the clear acrylic coating composition III and cured as above. Also, two panels of phosphatized cold rolled steel coated with the same electrocoating composition and with the same black base coat were sprayed with the clear coating composition III and cured as above. The same properties were measured for both sets of panels as above and the results are shown in Table 1.

A clear coating composition IV was prepared as above using fluorinated polyisocyanate solution II (prepared above) and acrylic polymer II solution was used in place of acrylic polymer I solution. Two panels of phosphatized cold rolled steel coated with the same electrocoating composition and with the same white base coat were sprayed with the clear coating composition IV and cured as above. Also, two panels of phosphatized cold rolled steel coated with the same electrocoating composition and with the same black base coat were sprayed with the clear coating composition IV and cured as above. The same properties were measured for both sets of panels as above and the results are shown in Table 1.

TABLE 1

| Clear Coat | Base Coat | 20° gloss | DOI | Calculated PPM Fluorine in Composition |
|---|---|---|---|---|
| I | black | 80.2 | 81.3 | 6500 |
| I | black | 86.6 | 89.2 | 6500 |
| I | white | 77.2 | 60.2 | 6500 |
| I | white | 83.2 | 67.4 | 6500 |
| II | black | 77.5 | 90.7 | 5600 |
| II | black | 85.3 | 91.3 | 5600 |
| II | white | 85.8 | 96.8 | 5600 |
| II | white | 86.1 | 89.2 | 5600 |
| III | black | 80.1 | 95.6 | 1700 |
| III | black | 81.7 | 95.7 | 1700 |
| III | white | 78.2 | 94.5 | 1700 |
| III | white | 76.9 | 90.0 | 1700 |
| IV | black | 76.5 | 97.1 | 900 |
| IV | black | 78.7 | 86.6 | 900 |
| IV | white | 80.0 | 96.3 | 900 |
| IV | white | 79.6 | 96.6 | 900 |

Each of the Clear Coats I–IV has excellent gloss and distinctness of image (DOI)

EXAMPLE 2

Fluorinated polyisocyanate solution III was prepared by mixing the following constituents in a reaction vessel equipped with a mechanical stirrer, condenser, nitrogen inlet and a thermocouple:

|  | Parts By Weight |
|---|---|
| Portion 1 | |
| Aliphatic isocyanate resin (described in Example 1) | 3,626.0 |
| Butyl acetate | 332.0 |
| Ethyl acetate | 665.0 |
| Ethylene glycol monobutyl ether acetate | 212.0 |
| Portion 2 | |
| Fluoroalkyl alcohol [F(CF$_2$CF$_2$)$_n$CH$_2$CH$_2$OH which is a blend of homologuous series where 1–2% n = 2, 27–34% n = 3, 29–34% n = 4, 17–21% n = 5, 6–9% n = 6, 2–5% n = 7 and 1–2% n = 8] | 116.0 |
| Di-n-butyl tin dilaurate (2% solids in ethyl acetate) | 0.5 |
| Total | 4951.5 |

Portions 1 and 2 were each added to the reaction vessel under a positive pressure of nitrogen and heated to about 75°–85° C. and held at this temperature for about 2 hours and allowed to cool overnight. The resulting fluorinated polyisocyanate solution III contained about 2.5% of the fluorinated component.

A clear coating composition V was prepared by mixing the clear acrylic composition I, described in Example 1, with the above fluorinated polyisocyanate solution III in a 3/1 volume ratio. Two phosphated cold rolled steel panels electrocoated as described in Example 1 were spray coated with a white base coat described in Example 1 and coated with the clear coating composition V and cured following the procedure of Example 1. The resulting clear coat was smooth and essentially free of craters and had an excellent appearance and had excellent soil resistance and was easily washed or wiped clean.

EXAMPLE 3

Fluorinated polyisocyanate solution IV was prepared by mixing the following constituents in a reaction vessel equipped with a mechanical stirrer, condenser, nitrogen inlet and a thermocouple:

|  | Parts By Weight |
|---|---|
| Portion 1 | |
| Aliphatic isocyanate resin (described in Example 1) | 3,064.0 |
| Butyl acetate | 281.0 |
| Ethyl acetate | 562.0 |
| Ethylene glycol monobutyl ether acetate | 179.0 |
| Portion 2 | |
| Fluoroalkyl alcohol [Rf—CH$_2$CH$_2$—O—(CH$_2$CH$_2$O)$_n$—H where Rf is approximately 1% CF9, 50–60% C6F13, 20–40% C8F17, 5–15% C10F21, 1–5% C12F25, n is 15–20] | 27.8 |
| Di-n-butyl tin dilaurate (2% solids in ethyl acetate) | 0.5 |
| Total | 4114.3 |

Portions 1 and 2 were each added to the reaction vessel under a positive pressure of nitrogen and heated to about 75°–85° C. and held at this temperature for about 2 hours and allowed to cool overnight.

A clear coating composition VI was prepared by mixing the clear acrylic composition I, described in Example 1, with the above fluorinated polyisocyanate solution IV in a 3/1 volume ratio. Two phosphated cold rolled steel panels electrocoated as described in Example 1 were spray coated with a white base coat described in Example 1 and coated with the clear coating composition VI and cured following the procedure of Example 1. The resulting clear coat was smooth and essentially free of craters and had an excellent appearance and had excellent soil resistance and was easily washed or wiped clean.

We claim:

1. A fluorinated polyisocyanate which comprises an organic polyisocyanate reacted with a fluorinated monofunctional alcohol represented by the formula

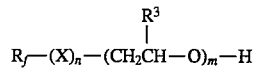

where $R_f$ is a fluoroalkyl containing group having at least 4 carbon atoms, X is a divalent radical, $R^3$ is H or an alkyl group having 1–4 carbon atoms, n is 1 and m is 1–30, wherein about 0.1–10 mole percent of active isocyanate groups are reacted with the fluorinated monofunctional alcohol.

2. The fluorinated polyisocyanate of claim 1 in which $R_f$ is a straight chain or branched chain perfluoroalkyl group having 4–20 carbon atoms.

3. The fluorinated polyisocyanate of claim 2 in which X is —O—, —CH$_2$CH$_2$O—, —CH$_2$O—, —SO$_2$N(R$^4$)CH$_2$CH$_2$O—, —CH$_2$— where $R^4$ is an alkyl group having 1–4 carbon atoms, $R_3$ is H or methyl.

4. The fluorinated polyisocyanate of claim 1 in which the organic polyisocyanate is an aromatic diisocyanate, aliphatic diisocyanate, cycloaliphatic diisocyanate, aromatic triisocyanate, aliphatic triisocyanate, cycloaliphatic triisocyanate or an oligomer of a diisocyanate.

5. A process for forming the fluorinated polyisocyanate of claim 1, which comprises reacting a fluorinated monofunctional alcohol represented by the formula

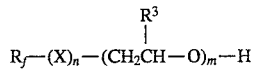

where $R_f$ is a fluoroalkyl group containing at least 4 carbon atoms, X is a divalent radical, $R^3$ is H or an alkyl group having 1–4 carbon atoms, n is 1 and m is, 1–30 with an organic polyisocyanate in the presence of a catalyst and reacting about 0.1–10 mole percent of active isocyanate groups with the fluorinated monofunctional alcohol.

6. A composition comprising the fluorinated polyisocyanate of claim 1 and a film forming polymeric binder.

7. The composition of claim 6 in which the binder is an acrylic polymer, a polyester, an alkyd resin, a polyol or mixture of any of the above.

8. The composition of claim 6 in which the composition contains a solvent for the fluorinated polyisocyanate and polymeric binder.

* * * * *